April 28, 1942. H. RUSKIN 2,281,250
METHOD OF MAKING SPIRAL CUTTERS
Filed Dec. 8, 1938 2 Sheets-Sheet 1

Henry Ruskin
INVENTOR.
BY Clarence E. Threedy
HIS ATTORNEY.

April 28, 1942. H. RUSKIN 2,281,250
METHOD OF MAKING SPIRAL CUTTERS
Filed Dec. 8, 1938 2 Sheets-Sheet 2

Henry Ruskin
INVENTOR.
BY Clarence E. Threedy
HIS ATTORNEY.

Patented Apr. 28, 1942

2,281,250

UNITED STATES PATENT OFFICE 2,281,250

METHOD OF MAKING SPIRAL CUTTERS

Henry Ruskin, Chicago, Ill., assignor of one-half to George E. Hale, Chicago, Ill.

Application December 8, 1938, Serial No. 244,593

2 Claims. (Cl. 76—104)

This invention pertains broadly to dry-shaving devices and more particularly to a method of making spiral cutters therefor.

A particular object of the invention is the provision of a spiral cutter in the form of a helix of steel ribbon, the outer peripheral surface portion of which is of greater width laterally across the ribbon than the inner peripheral surface thereof so as to form sharp cutting edges along the juncture of the outer peripheral surface of the ribbon with the remaining body portions thereof.

Another object is the provision in a dry-shave device of a movable cutting member which may be placed directly against the skin in effecting its cutting operation, due to certain peculiarities in the form and construction of the cutting elements.

Another object is the provision of a method of making a cutting helix in which a convolute steel ribbon is formed so as to have a somewhat triangular or trapezoidal cross section with the outer lateral surface of the ribbon sloping inwardly in a convergent manner so as to leave sharp edges along the juncture of the outer peripheral surface with the sloping body portions.

Another object is the provision of a stationary cutter or shear, and method of making the same, for cooperation with the spiral cutter and in which slots are formed with a certain pitch cooperable with the pitch of the spiral, and the slots are formed to provide combing teeth therebetween.

Yet another object is the provision of a cutter having pitched teeth or slots of particular contour.

A further object is the provision of a helical cutter, and method of making the same, in which there is a steel helix the convolutions of which are wider on their outer peripheral surface, transversely of the length thereof, than at their inner peripheral surface, the helix being of a unitary structure and having integral mounting means, or the helix being of a composite structure in which the helix is mounted on a mandrel.

Other novel aspects and objects of the invention reside in details of the construction, operation, form, and location of the parts of the device of the illustrative embodiment, as well as in the various steps of the method of making said device, all of which is described hereinafter in conjunction with the annexed drawings, in which.

Figure 4:
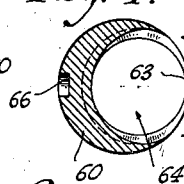
Figure 3:
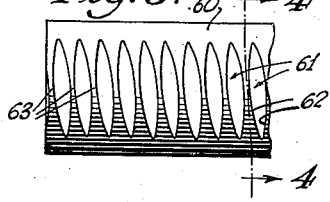
Figure 2:
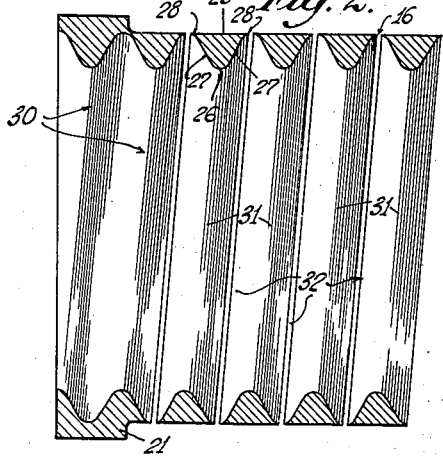
Fig. 2 is an enlarged fragmentary median section along line 2—2 of Fig. 1.
Figure 5:
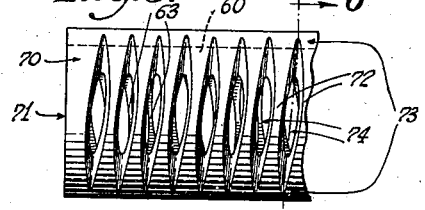
Figure 6:
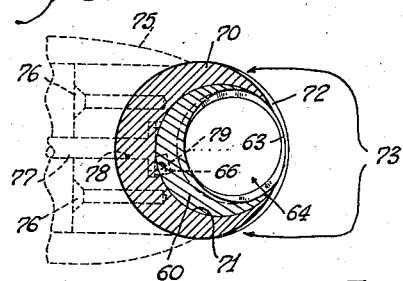
Figure 2A:
Figure 8:
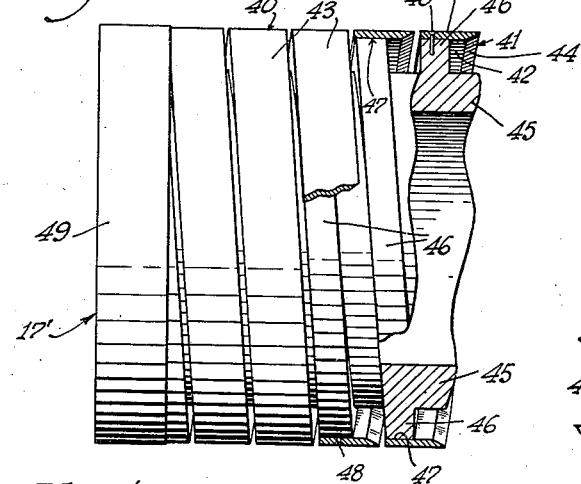
Figure 7:
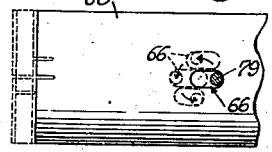
Figure 9:
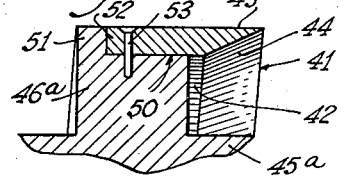
Figure 10:
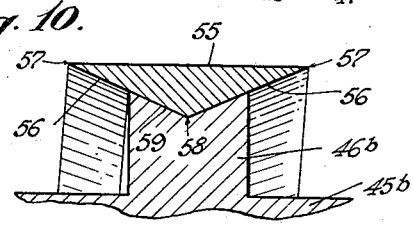
Figure 11:
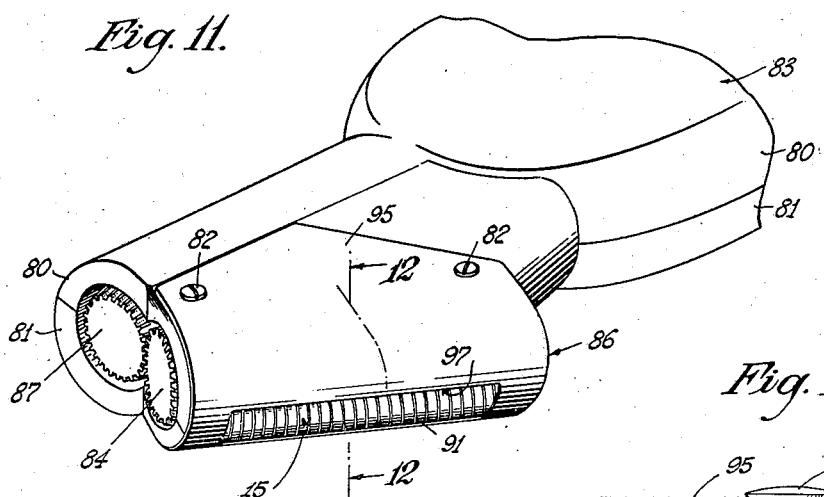
Figure 12:
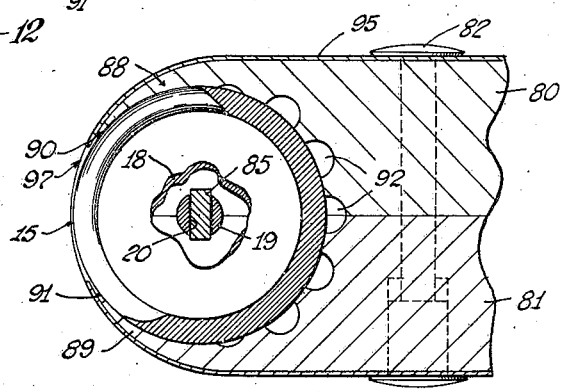
Figure 13:
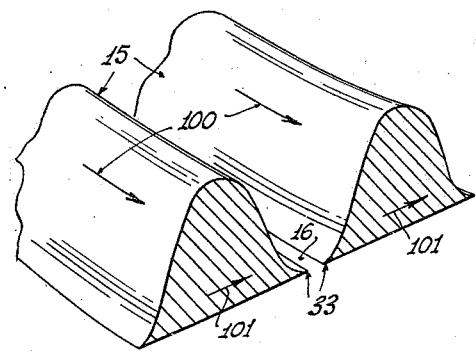
Figure 14:
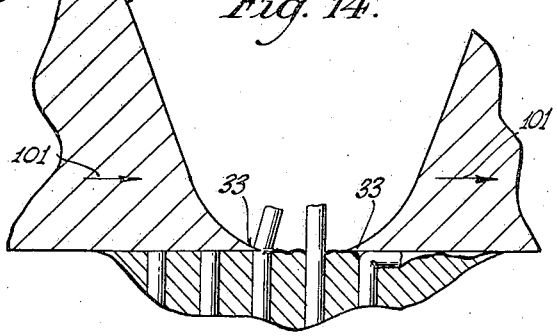

Fig. 2—A is a magnified sectional fragment of the helical cutting edges shown in Fig. 2;

Fig. 3 is a fragmentary front elevation of a modified cutter with pitched cutting slots and combing formations therebetween;

Fig. 4 is a transverse section along line 4—4 of Fig. 3;

Fig. 5 is a fragmentary front elevation of a stationary cutter having pitched shear slots and combing teeth for cooperation with the shear of Fig. 3;

Fig. 6 is a transverse section through the assembled cutter elements of Figs. 3 and 5 and drive means therefor;

Fig. 7 is a rear elevation of the movable shear of Fig. 4 as assembled in Fig. 6 showing the complex drive means;

Fig. 8 illustrates a modified spiral cutter and method of making the same, wherein the helix is mounted on a mandrel to provide a composite cutter with a single cutting edge;

Fig. 9 is a magnified sectional fragment of the ribbon and method of mounting the same on its mandrel; while Fig. 10 is a modified form of composite helical cutter in which the cutting helix is double-edged;

Fig. 11 is an enlarged fragmentary perspective of a shaving device employing the helical cutter;

Fig. 12 is an enlarged fragmentary vertical section through the shaving head and cutter, as seen along line 12—12 of Fig. 11;

Fig. 13 is a fragmentary perspective of adjacent turns of the cutting helix illustrating the complex motion thereof; while Fig. 14 is a magnified fragmentary section taken transversely through adjacent cutting turns of the helix to illustrate the cutting action thereof.

This application is in part a continuation of my United States Patent No. 2,161,981 of June 13, 1939.

The invention of this application provides a new form of spiral cutter and a means for making the same which, due to inherent structural and functional characteristics to be brought out hereinafter, may be used in direct contact with the skin of the shaver without any guard whatever.

By employing the method disclosed herein, it is possible to make helical cutters in which the turns of the helix are placed any desired distance apart so that cutting helices may be made variously for use in dry shaving devices and critical spacing between the turns controlled with a very high degree of accuracy. Moreover, the method makes possible the provision of extremely sharp cutting edges extending along the margins of the turns of the helix, the outer surfaces of the cutter nevertheless being flat so that they may safely bear against the skin of the shaver without the slightest danger of injury. Due to the fact that the spacing between the turns of the cutting helix is absolutely under control, such spacing may be held to a dimension which will preclude the possibility of skin entering between the turns of the helix where it could be cut or torn, the spacing nevertheless admitting hairs of a predetermined range of length and thickness between the turns.

Figure 1:
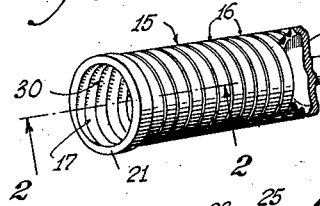
Fig. 1 is a perspective view of a cutting helix.

In one of its forms, as illustrated in Fig. 1, the spiral cutter includes a helix 15 of steel "ribbon" or stock in which the convolutions are spaced from each other a predetermined amount as at 16 (Fig. 2 also), and in which one end 17 is left open while the opposite end is provided with an integral end plate 18 from which projects a stud shaft 19 having a slot 20, the stud shaft being mounted in a suitable bearing member to support the helix in cutting position, and a suitable drive means being connected to rotate the helix through the agency of the slot 20. It should be observed that the axial extremities of the helix adjacent its open end 17 are enlarged to provide a collar 21, the latter serving to support the helix in proper cutting position in cooperation with its stationary shear.

An important peculiarity of the cutting helix is the cross sectional shape of the ribbon forming its convolutions, this cross sectional shape being particularly illustrated in Fig. 2 wherein it will be observed that the outer peripheral surface 25 of the ribbon is wider in a direction laterally across the same than the inner peripheral surface 26 thereof whereby the intervening side wall or body portions 27 tend to converge in the surface 26 so that the junctures 28 between the outer peripheral surface and the remaining body portions, for example, the sloping sides 27, provides a sharp cutting edge along the opposite outer peripheral edges of the ribbon or convolutions of the helix. It is to be understood that the term "ribbon" as used herein is intended to apply both to a relatively flat and narrow length of stock such as shown, for example, in Fig. 8, and to the relatively thick stock shown in Fig. 2, except as may be otherwise specifically provided hereinafter.

As a result of the foregoing cross sectional shape of the ribbon or filamentary stock from which the spiral or helix is wound or formed, the cutting edges 28 are self-sharpening in those arrangements wherein the cutting helix is employed with a stationary shear against which the outer peripheral portions of the helix bear during rotation.

Another important feature of the invention is the method provided for making a cutting helix such as shown in Fig. 1. In this method, a rod of steel, preferably cylindrical in shape, is drilled from one end, which corresponds to the open end 17 of the helix 15, to a depth substantially equivalent to the desired depth of the helix, the bore terminating at the end plate or wall 18, and at a suitable stage in the procedure the stock is turned down to form a stud shaft 19 which is integral with the plate 18. When the bore has been completed, the resulting tubular stock is threaded internally so as to provide the threads 30 (Fig. 2), the crest or ridge portions 31 of which may be of any degree of sharpness ranging from a relatively flat land such as is shown in my aforementioned copending application, to a sharp ridge, the ridge portions 31 of the present threading being slightly rounded and constituting the inner peripheral surface of the convolutions of the spiral or helix. The intervening recessed portions or valleys 32 (Fig. 2—A also) between the ridge portions 31 of the threads are termed herein for purposes convenience of the troughs.

A tap suitable for use in threading the sleeve, and one which results in a thread having a contour and pitch especially suitable in the production of a cutting helix for use in a dry shaver, is one which is threaded with a Whitworth standard thread 3/8"–16.

After the sleeve form or bore has been tapped as aforesaid, the same is placed in a lathe or grinding machine, and the outer peripheral portions thereof are ground down so as to leave the collar 21 at one end thereof, the grinding or turning being continued to a depth sufficient to cut through the trough portions 32 between each internal thread and until the trough portions have been cut to a certain depth to provide the desired spacing 16 between the turns of the helix.

In the embodiment of Fig. 2, which illustrates the contour of thread resulting from the employment of a tap of the type mentioned, it will be observed that the slope of the side portions 27 of each thread decreases and tends to level off as these sides approach their junctures 28 with the outer peripheral surface 25 of the helix so that acutely sharp cutting edges 33 will result (Fig. 2—A).

The slope of the sides 27 may be made straight if it is desired to have the cutting edge wear down uniformly, although in this arrangement there is some sacrifice of initial sharpness, the cutting edges 33 shown in Fig. 2—A being extremely sharp in the first instance, so sharp, in fact, that the spiral has been used without any cooperating stationary shear or guard but placed directly against the skin, and the spiral cutting edges of themselves positively cut hair.

In the modified form of spiral cutter shown in Fig. 8, a steel ribbon 40 of relatively thinner stock than that which results in the ribbon convolutions of the spiral of Fig. 2, is ground along one of its inner edge portions to provide a cutting edge 41 which, as will be observed in the enlarged view of Fig. 9, slopes outwardly from the inner peripheral surface 42 of the ribbon to the outer peripheral surface 43 thereof, the pitch of the sloping side portion 44 which results from the grinding, however, being uniform, as distinguished from the curvilinear pitch shown in Fig. 2—A.

After grinding as aforesaid, the steel ribbon 40 is wound spirally upon a sleeve or tubular mandrel 45 on the outer peripheral portions of which have been provided threads 46 of square configuration and having particularly flat lands or tops 47 which engage the inner peripheral surfaces 42 of the helical ribbon, the helix being wound or tightly fitted over the mandrel and the threads 46 thereon, and the ribbon being secured to the mandrel by means such as pins 48 which are driven through the ribbon into the threads 46 at suitable intervals. A collar 49 may be sweated onto the endmost portions of the helix at the open end 17' thereof, while the opposite end of the mandrel 45 may be provided with an end plate and stud shaft, such as shown in Fig. 1.

In a modified arrangement of the ribbon spiral shown in Fig. 9, the mandrel 45a has its spiral threading or ridges 46a provided with an open-sided groove 50 along the top land at one side thereof so as to leave a spiral ridge 51, the inner peripheral surface portions 42 of the spiral ribbon being wound into the groove or track 50 with the unsharpened edge portion 52 thereof abutting the ridge 51, and pin means 53 being driven through the ribbon into the main ridge portion 46a. This latter arrangement provides a mounting for the cutting spiral which is exceedingly rigid and strong.

In still another modified arrangement of the sharpened steel ribbon, the ribbon 55 (Fig. 10) is sharpened along both edges from its inner periphery to provide convergently sloping sides 56 extending from the outer peripheral surface thereof so that opposite cutting edges 57 will result, the sloping sides converging in a ridge 58 which constitutes an inner peripheral portion of the spiral analogous to the inner peripheral ridge portions 31 of the arrangement of Fig. 2. In order to mount the cutting ribbon of Fig. 10, the mandrel 45b has its ridge portions 46b spaced somewhat farther apart with the top land portions thereof cut to provide a V-shaped seating groove 59 into which the convergent sides 56 of the ribbon fit firmly, the ribbon preferably being threaded onto the ridges 46b and gripping the latter tightly enough so that no other attaching means is necessary, an end collar analogous to the collar 17' of the arrangement of Fig. 8 likewise being applied to this latter form of helix and serving to prevent the ribbon from working off of the mandrel.

In Fig. 3 there is shown a movable cutter in the form of a sleeve member 60 having a plurality of oblate openings 61 aligned thereacross in a direction transverse to the long axis of the sleeve, these openings constituting shear slots, and being pitched or slanted relative to the aforesaid axis of the sleeve at a predetermined angle for reasons which will appear hereinafter. The curved marginal portions 62 of the oblate shearing slots are sharp as a result of the fact that the intervening body portions 63 therebetween are, in a manner of speaking, undercut in the sense that the inner peripheral portions of the helix of Fig. 2 may be said to be undercut.

In forming the cutter of Fig. 3, a piece of steel stock of preferably tubular form is provided with an eccentric bore 64, which bore is subsequently tapped and threaded with a thread similar to that used in Fig. 2, if desired, the pitch and shape of the thread being determined largely by the various resultant cutting characteristics which may be required in one or another instance. When the bore has been tapped, the stock is placed in a lathe or grinding machine arranged to turn down the outer peripheral portions of the drilled and tapped stock concentrically with the cylindrical stock and eccentrically to the bore, with the result that the wall of the sleeve in the region indicated at 65 is turned down until the trough portions of the thread have been cut through in a manner described in conjunction with the process of Fig. 2, the oblate form of the slots 61 in the cutter of Fig. 3, however, resulting from the eccentricity of the bore in grinding. This oblate form of the slots is of importance due to the fact that hairs, particularly stubble, may readily project into the wider portions thereof, as the shaving device is moved over the face, to be worked toward the narrower portions of the slot, as the implement progresses over the surface being shaved.

A stationary guard or shear particularly suited for cooperation with the cutter of Fig. 3 is illustrated in Fig. 5, and includes a substantially cylindrical tubular guard 70 which is formed from a piece of steel stock in which there has been drilled an eccentric bore 71, and the outer periphery of which has been threaded to provide an external thread 72. After the guard has been threaded, it is placed in a lathe or grinding machine and turned down eccentrically so that all of the threading, save that in the region indicated at 73, is cut away, that portion of the threading in the region 73 likewise being slightly ground down so as to provide a flat outer peripheral surface suitable for contact with the skin. Thereafter, the bore 71 is ground away eccentrically so as to cut through the trough portions of the threading between the threads 72 thereof to provide somewhat oblate openings 74 which, however, are pitched oppositely to the cooperating shear slots 61 of the movable cutter of Fig. 3 as a result of employing a reverse thread in the stationary member of Fig. 5. It will be observed also in Fig. 5 that there is a slight twist in the appearance of the shear slots in the stationary guard sleeve 70; this results from the pitch of the thread and the eccentricity of the grinding.

In operative relationship, the movable cutting member 60 of Fig. 3 is dimensioned to have a close sliding movement within the stationary member or guard 70, the latter, in assembled relation, being secured to the head of a handle member 75 (Fig. 6) by means such as the screws 76, and there being a rotating crank shaft 77 driven by the usual motor means in the handle casing and which extends through a suitable opening 78 in the base of the sleeve 70. A crank pin 79 is mounted eccentrically on the end of the shaft 77 and projects into an elongated slot 66 (Figs. 4, 6 and 7) in a rear peripheral surface of the inner or moving cutting member 60.

As crank shaft 77 rotates, the crank pin 79 in the end thereof will rock the inner cutting member 60 so that the slot 66 thereof will be moved in opposite directions rapidly into and out of the dotted line positions of the slot indicated in Fig. 7, and substantially at the same time the crank pin 79, riding in one, left-hand, end of the slot 66 to the other, right-hand, end thereof, will reciprocate the cutter 60, the motion of the latter thus being complex, with the result that the shearing slot 61 in the member 60 will be moved at approximately the same time in a clipping movement across the slots 74 in the guard, and in a shearing motion as a result of the rocking movement thereof. Both the opposite pitch and the twist of the slots 74 in the stationary member cooperate with the slots 61 to give a particularly efficient shearing action, the oblate form of the shearing slots, moreover, alone, and in combination with the combing formations afforded by the ground-down external threads 72 in the guard being peculiarly effective to guide the beard into the slots.

One arrangement for employing the helical cutter of Fig. 1 in a shaving device, is illustrated in Figs. 11 and 12 wherein the cutter 15 is mounted for rotation between a pair of separable casing members 80 and 81 secured together by means such as the bolt 82, so that the cutter is disposed at an angle to the handle portion 83 of the remainder of the casing, as illustrated in Fig. 11, whereby the cutter may be conveniently manipulated relative to the shaving surface. A driven gear 84 is drivingly engaged with the slotted end portion 20, as seen in Fig. 12, wherein a lug 85 on the gear 84 is disposed in the slot 20 on the stud shaft 19 of a cutter made in accordance with the arrangement of Fig. 1. The opposite or free end of the helical cutter is exposed at the opposite end 86 of the head, and the collar portion 21 (not seen) rides on the inner peripheral portions of the casing members 80 and 81. The gear 84 is driven by another gear 87 having connection with an electric motor in the handle portion 83 of the casing.

The outer edge portions 88 and 89 of the separable members of the head are beveled so as to have horizontal marginal edges 90 and 91 disposed closely against or at the periphery of the cutting helix, these marginal edges defining a horizontal open slot through which a predetermined portion of the peripheral surface of the helix is exposed for direct contact with the face of the shaver. The inner surface portions of the separable casing head members are relieved by channeling 92 to reduce the friction of the helix in rotation.

A cover plate 95 is fitted around the shaving head and secured in place by bolts 82 with an elongated open slot 97 registered with the slot formed by the members 80 and 81 so that the predetermined peripheral surface portion of the cutting helix is exposed for direct contact with the face of the shaver.

In the cutting operation of the helix as employed in the arrangement of Fig. 11, it is pointed out that the turns of the helix have two degrees of movement in their cutting action, this being brought out in Fig. 13, wherein the tracer arrows 100 indicate the rotative motion of the turns, while the tracer arrows 101 indicate the translating or axially shifting cyclic motion of the turns.

Due to the extreme sharpness imparted to the cutting edges 33 as a result of the method employed in forming the helix, the complex motion of the same makes it possible to employ a new principle in dry shaving, wherein the hairs or bristles are cut and sliced simultaneously.

The importance of this, in addition to simplifying the manufacture of the shaving implement by omitting the guard, resides in the fact that an ordinary cutter or blade moving only transversely of a bristle, tends to bend the latter over prior to and during the cutting operation with the result that the bristle is not shorn in a perfectly transverse section, but is cut obliquely so that the cut portion of the bristle, instead of being substantially cylindrical in appearance, is elliptical. Thus, while a blade which moves only transversely may have begun its cutting action at a point very close to the base of the bristle, this action may end at a point appreciably farther away from the base, so that the hair is not cut as short as it should be. Such incomplete or oblique cutting is substantially eliminated by the present invention.

The rotative movement of the cutting edges of the helix simultaneously with their translatory movement, effects a slicing action, as well as a direct cut, so that the bristles are shorn evenly across and very close to the skin, as is brought out in the diagrammatic illustration of Fig. 14.

Unless otherwise expressly provided, the recitation in the appended claims, in a certain order, of the various steps in the fabrication of cutters or members having slots such as hereinbefore described, is not to be construed as requiring such steps to be effected in the order named, except where the operation by its very nature requires that it be effected in a particular order with relation to the other steps of the method.

The objects and advantages of the invention both with respect to the method and the product thereof, may be realized by other forms of construction and changes in the procedure of the method without departing from the broad spirit of the invention, and it is a condition of this disclosure that all equivalent arrangements and methods are to be included within the call of the appended claims.

Having thus described my invention, what I claim as new and desire to protect by Letters Patent is:

1. The method of making cutters with spirally pitched shear slots, which comprises drilling an eccentric bore in a piece of cylindrically formed stock, threading said bore with a thread of the desired pitch of said slots, and grinding the exterior surface portions radially of said bore and eccentrically relative to said bore until the trough portions between said threading are cut through to provide slots pitched conformably with the pitch of said threading.

2. The method of making cutters which comprises the provision of a bore in a piece of stock, cutting a spiral groove in said bore, and grinding said piece of stock exteriorly and eccentrically relative to said bore whereby to grind away a portion of said stock in the region of the latter having substantially the closest radial distance to the center of said bore, said grinding being continued until the base portions of said stock, in said last-mentioned region, between the ridge portions of said spiral groove, are cut through.

HENRY RUSKIN.